June 3, 1958 F. W. YOUNG 2,837,344
FOLDING BABY SEATS FOR TELESCOPING CARTS
Filed Jan. 6, 1956 4 Sheets-Sheet 1
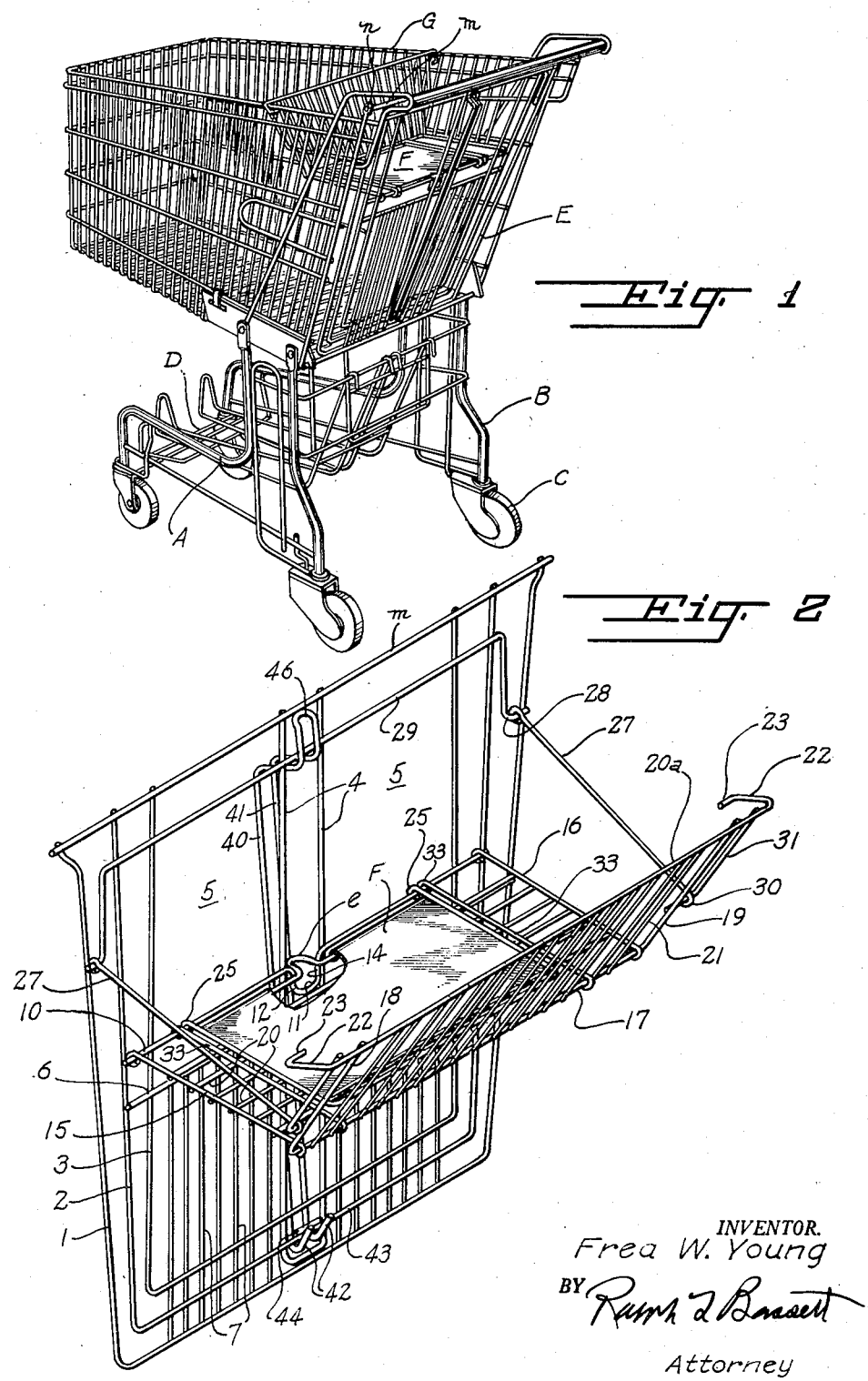
INVENTOR.
Frea W. Young
BY
Attorney

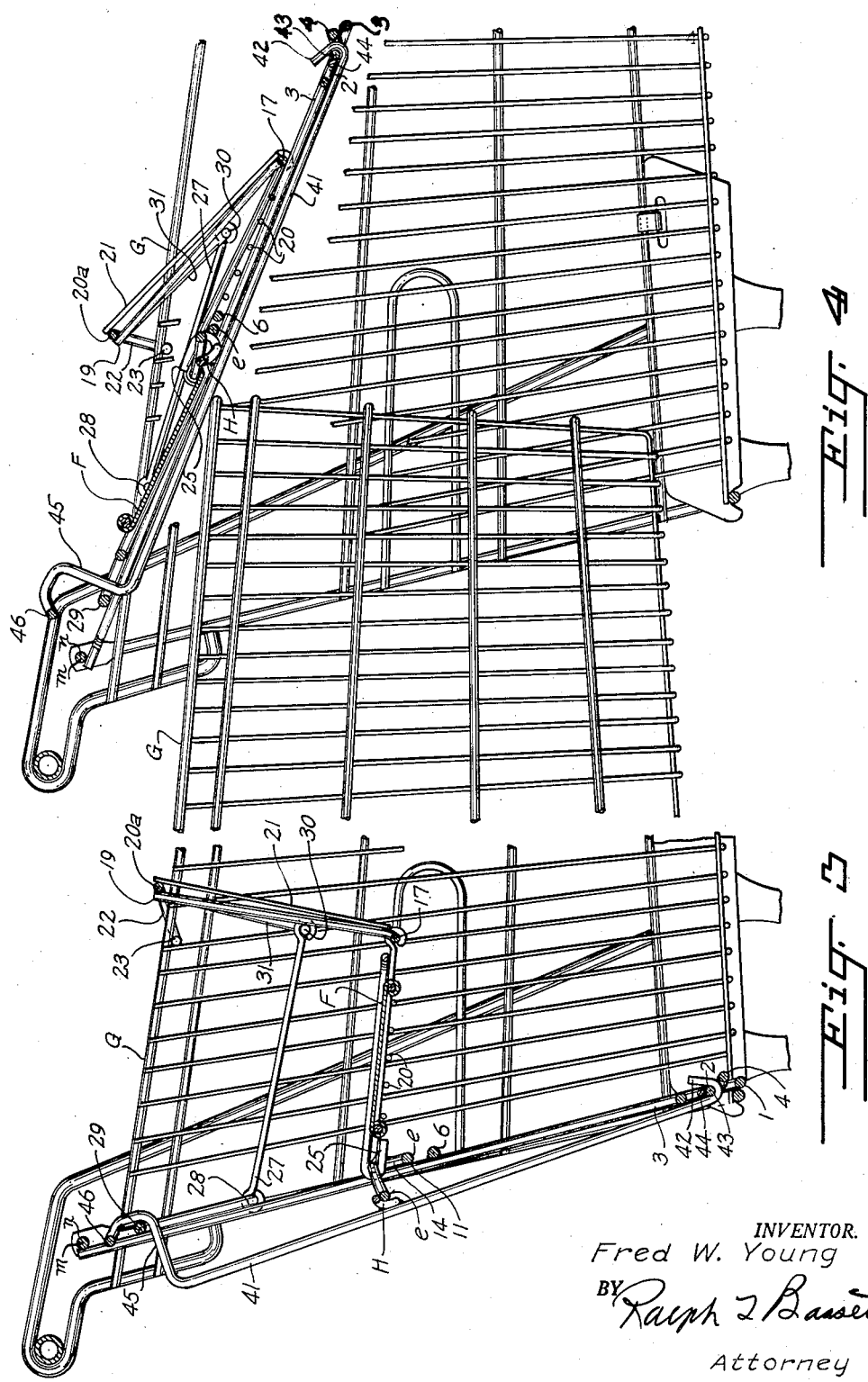

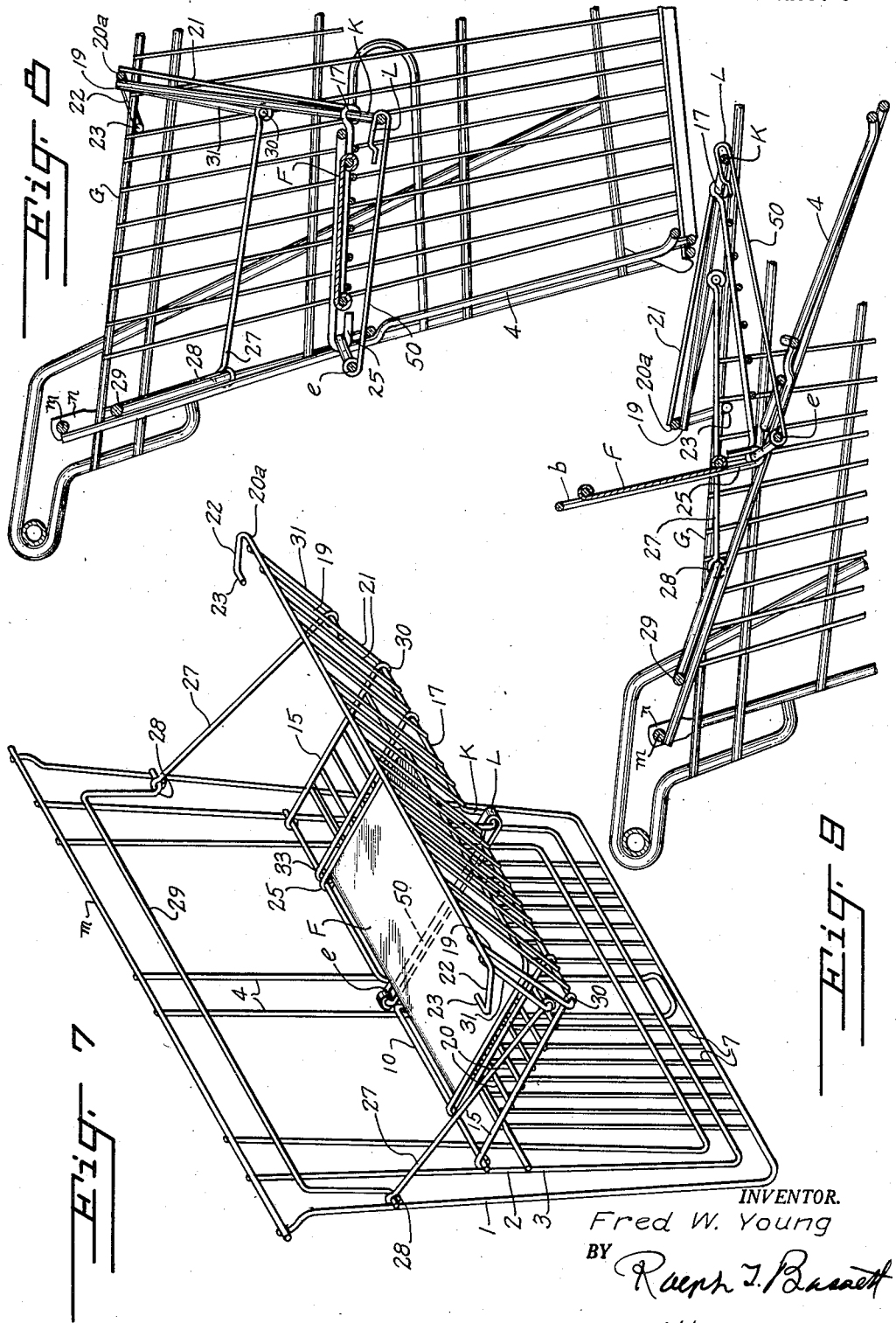

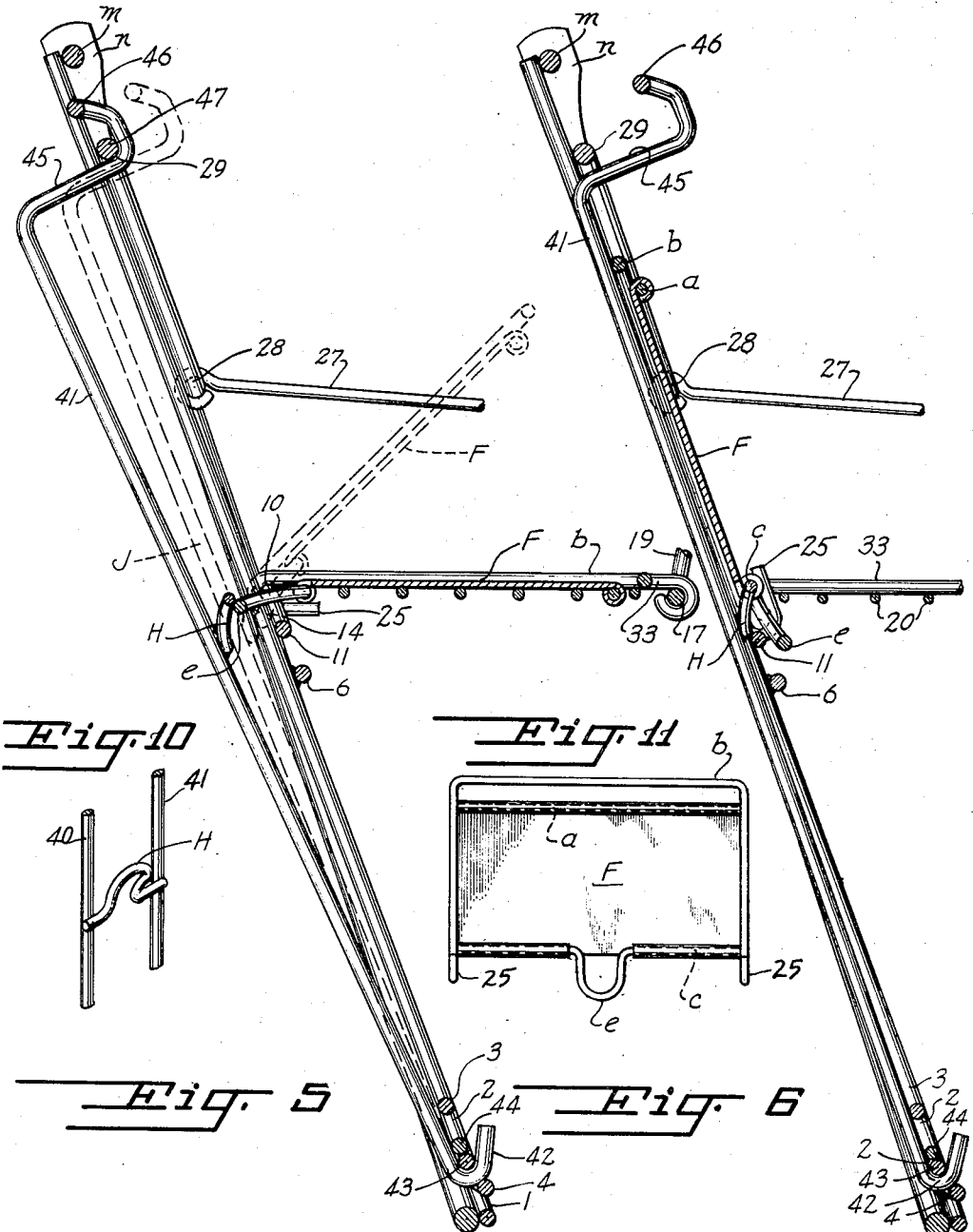

United States Patent Office 2,837,344
Patented June 3, 1958

2,837,344
FOLDING BABY SEATS FOR TELESCOPING CARTS

Fred W. Young, Oklahoma City, Okla., assignor to Sylvan N. Goldman, Oklahoma City, Okla.

Application January 6, 1956, Serial No. 557,765

12 Claims. (Cl. 280—33.99)

This invention relates to folding baby seats for telescoping carts.

Heretofore the majority of baby seats forming a part of a telescoping cart assembly have included a panel which forms the back and the support for the seat, this panel extending diagonally from the back of the seat and converging toward the gate upon which it is mounted. By this construction considerable room in the telescoping cart is blocked from use and its intended purpose.

It is an object of the present invention to provide a seat attachment for the swinging gate of a telescoping cart which is foldable against the swinging gate to which it is attached but does not have as a part of its assembly the space consuming supporting hinged panel.

Another object of the present invention is the provision of a folding seat as an attachment for the swinging gate of a telescoping cart in which the leg openings in the swinging gate are closed by a hinged panel and in which the hinged panel is elevated to close the leg openings to provide a receptacle for small packages.

Another object of the present invention is to provide in a folding seat of the type specified, means for automatically elevating the leg closing panel upon engagement with a second carrier when the latter is moved towards telescoping association with the first carrier.

Another object of the present invention is to provide an assembly of the type described in which the panel used as a closure for the leg openings also functions in maintaining the seat in open position when the panel is in lowered position.

Another feature of the present invention is the use of trigger mechanism to facilitate the folding of the gate, the trigger mechanism being operated by contact with a second carrier when the latter is moving toward telescoped position with the first carrier.

These and other objects of the invention will more clearly appear by reference to the accompanying drawings forming a part of the instant specification, and wherein like characters of reference designate corresponding parts throughout the several views, in which:

Fig. 1 is a perspective view of one form of the invention;

Fig. 2 is an enlarged perspective view of a swinging gate for telescoping carriers showing the seat in its open position;

Fig. 3 is a fragmentary transverse section of the invention of Fig. 1 showing the seat in open position;

Fig. 4 is a fragmentary side elevation showing the actuation of the triggering mechanism during nesting of associated telescoping carts;

Fig. 5 is a fragmentary transverse section showing two positions of the triggering mechanism;

Fig. 6 is a similar view showing the closure plate for the leg opening in elevated position;

Fig. 7 is a perspective view of a gate having a modified form of folding seat in open position;

Fig. 8 is a transverse section of the invention of Fig. 7 showing the latch mechanism in position with the seat open;

Fig. 9 is a fragmentary view showing the seat of Fig. 7 in partially collapsed position occurring during nesting association of a pair of associated telescoping carts;

Fig. 10 is a detail showing the cam hook carried by the trigger mechanism; and

Fig. 11 is a plan view of the swinging plate.

In the present invention there is disclosed a telescoping carrier of the general type shown in Goldman Patent No. 2,508,670, and in which there is a frame including front uprights A and rear uprights B, all supported on casters C. This frame is provided with lower bracing and supporting structure indicated generally at D. The upper ends of the front and rear uprights A and B support a telescoping basket, this telescoping basket including an inclined bottom, converging side walls and a front wall. The rear end of the basket is closed by a fabricated hinged gate E supported on a transverse rod m hinged to upright frame members n at each side of the basket. This hinged gate is formed of U-shaped frame members 1, 2 and 3 and intermediate vertical uprights 4 defining leg openings 5. Beneath the leg openings 5 is a transverse brace 6 and a plurality of wires 7 close the gate beneath the transverse brace 6 and to the bottom of the structure. Above the transverse brace 6 and extending generally parallel therewith is a cross rod 10, the extremities of which are welded to the uprights 2 and 3 of the frame. The medial portion of the rod member 10 is offset to provide a U-shaped portion defined by base 11 and arms 12 and 14, this U-shaped portion being of a width defined by the space between the upright braces 4. This U-shaped offset portion forms a stop for locking the leg opening plate in vertical position and also provides a clearance for the movement of the trigger mechanism, as will more clearly hereinafter appear. To the end portions of the cross rod 10 are hingedly connected the main seat side frame members 15 and 16, these seat frame members 15 and 16 terminating about the base 17 of a U-shaped frame which includes side arms 18 aand 19 and defines the back of the seat. The side members 15 and 16 of the seat are closed by a plurality of spaced transverse rods 20 which are welded to these side members at their extremities. The base 17 of the U-shaped frame of the back and the top 20ª of the back are connected by a plurality of vertical rods 21 which are welded to these parts 17 and 20ª as clearly shown in Fig. 2. The top 20ª of the back is provided with rearwardly extending arms 22 which terminate in inwardly projecting extremities 23, these extremities 23 being adapted to engage about the top frame G (Fig. 1) of the side walls of the basket.

The closure plate for the leg openings 5, which is indicated by reference character F, includes a U-shaped frame, the arms of which terminate in hooks 25 which wrap about the cross brace 10 of the gate, this connection providing a hinge permitting the closure plate F to swing to its lower position as shown in Fig. 2 or to its upper position closing the leg openings 5 as shown in Fig. 6. Additional braces for the seat include side links 27 which are hingedly connected at their outer ends to the downwardly and offset extremity 28 of the cross brace 29 of the gate frame, it being understood that the ends of the offset portions 28, and in fact all intersecting portions of the cross member and the gate structure, are welded. The inner ends of the links 27 hook about the inwardly projecting arms 30 of the shortened rods 31 which are spaced outwardly of the back of the seat frame. The rods 31 at the end of its inwardly projecting extremity 30 are each welded to the adjacent arm of the U-shaped back frame member 17 and to the upper seat back frame member 20a. An additional hinge and brace is likewise provided for the seat and is indicated at 33, this brace being in the form of a reinforcing bar welded to the cross wires 20 and terminating in hinged loops at their free ends, the loops at their free ends contacting cross brace 10 and the base of the U-frame of the seat.

The plate which is utilized for closing the leg openings 5 when the seat is operating as an auxiliary parcel carrier for small packages, includes a cross brace *a* adjacent the base of the U-frame *b* and a cross brace *c* positioned slightly inwardly of the elongated loops 25 which form the hinges and mount the plate on the cross bar 10. The medial portion of the cross brace *c* is offset downwardly into U-form as at *e*, being slightly bent out of the plane of the seat and downwardly therefrom to facilitate the locking and unlocking operation when the U-shaped projection *e* moves to opposite sides of the loop 11, 12 and 14 when assuming its locked position. The locked position is accomplished by vertical downward movement of the closure plate assembly to the extent permitted by the elongated loops 25 in their association with the cross brace 10, this movement being just sufficient to permit the loop *e* of the plate to be biased across and downwardly of the loop 11, 12 and 14 a sufficient distance to lock the plate in its vertical position. When in horizontal position the loop *e* of the plate projects through the upper portion of the loop 11, 12 and 14 and outwardly and beyond the central cross brace 10 for engagement with a triggering mechanism. By reference to Figs. 5 and 6 it will be seen that the loop or projection *e* of the leg opening closure plate F has its outward end portion slightly curved so as to be downturned at its outer projecting extremity to freely coact with the associated part of the triggering mechanism.

Referring to Figs. 5 and 6 there is illustrated the mechanism which upon initial telescopic association between two telescoping carriers triggers the leg opening closure plate F to cause its movement from horizontal seating position to an upward position against the inner face of the swinging gate E. It will be noted from Fig. 1 that when the leg opening closure plate F is in horizontal position, it lies upon the seat supporting structure formed by the frames 15 and 16 and the transverse rods 20 and provides a seat cover therefor. The upper surface of the member F may be provided with any finishing material such as nickel chrome or may be provided with a fabric cushion. When this leg opening plate assembly F is in its upper position the projection *e* extends downwardly and engages the inner face of the base 11 of the downwardly extending loop formed medially of the rod 10. This position is available because of the elongated eyes 25 which permit the same to move in the direction of its width and is shown in Fig. 6. In this figure the base of the loop *e* is inward of the bottom 11 of the loop in the rod 10, this holding the plate F in its upright position against the inner face of the swinging or hinged gate E. Normally the leg opening closure plate or the seating member F, this member having the two separate functions, is not free for movement from the horizontal to the upright position because of the engagement of the loop *e* with the underface of the camming member H forming a part of the trigger mechanism. This trigger mechanism is shown as formed of a rod bent upon itself to provide two elongated spaced rods 40 and 41 to which the inwardly extending wire camming member H is connected medially of the length of the legs. The legs 40 and 41 have their lower terminals formed into hooks 42 which loop beneath the cross rod 43 and are secured in place by a lock bar 44 extending between the rods 40 and 41 immediately above the loop, the space between the lock bar and the base of the loops being sufficient to permit free movement of the loops on the rod 43 but preventing displacement of the hook 42, whereby the trigger structure is free to swing on the pivotal connection a distance determined by the angular projection 45 formed at the end portions of the members 40 and 41, the angular projection 45 terminating in upwardly and outwardly extending closed terminal 46 which engages the cross rod 47 at the top of the gate. By reference to Fig. 2 it will be seen that the bar 44 being welded at its extremities to the rods 40 and 41 immediately above the loops will form a closure for the loops, or at least sufficient closure to confine the loops against displacement. Normally the lock bar 44 rests upon the upper surface of the cross rod 43 and supports the trigger mechanism. There is enough clearance between the ends of the hooks 42 and the lock bar 44 to permit these members to be forced over the cross rod 43 for positioning or removing the legs 40 and 41 of the trigger mechanism. This extension 46 limits the outward movement of the trigger mechanism while the inward movement of this same means is determined by the initial spacing of the parts. When this triggering mechanism is in its normal outer position it will be seen that the medial loop H overlies the loop *e* of the plate F and frictionally retains the same in its position. Upon telescopic association of two carts, as illustrated in Fig. 4, it will be seen that the top wire G of the tapered basket will initially engage the trigger bars 40 and 41, swinging the trigger mechanism inwardly as shown in dotted lines at J in Fig. 5 and due to the curved cam face of the loop element H carried by the trigger arms, force the plate F into its vertical position shown in Fig. 6 and closing the leg openings 5. When in this position there is no restraining mechanism for the folding hinged seat sections, i. e. the back and bottom of the seat sections, and these sections will fold upon themselves as shown in Fig. 4 as the swinging gate moves to its horizontal position. Upon separating the inner basket from the outer basket, the swinging gate E will drop to its normally closed position and due to the hooks 22 having their supporting engagement with the top wire G of the basket, the seat will again assume its open position shown in Fig. 3. When in such a position the closure plate F will still retain its upper position closing the leg openings 5 and forming with the seat bottom and back a rectangular receptacle for holding small parcels and perishable material. When the assembly is to be used by a child, the seat will be moved vertically or in the plane of the hinged gate to shift the loop *e* of the plate F above the base 11 of the downwardly extending loop in the cross brace 10, this movement being permitted by the elongated hinge eyes 25 and permitting the closure plate F to swing to the seat supporting structure and in position for receiving a child.

In the modified disclosure of Figs. 7, 8 and 9, the assembly is identical with the preferred form of the device as disclosed in the other figures with the exception that the triggering mechanism is eliminated, and in lieu thereof a link 50 is provided, this link extending between the loop *e* of the plate assembly F and a depending offset portion K of the base 17 of the U-frame. The purpose of the link is to cause an upward swinging of the plate F as the gate moves upwardly and permits the folding of the seat sections, i. e. the length of the link is such that the arc of movement of the seat back will swing the offset portion *e* of the plate F on its pivotal mounting vertically towards the upper inner face of the swinging gate. The movement of the plate F due to the triggering by virtue of the pull through the link 50 provides the force necessary for initiating the movement of the plate F, this plate when reaching slightly beyond its vertical position, as in Fig. 9, by its own weight completing its movement onto the inner face of the swinging gate.

It will be noted from an examination of Fig. 8 that the weight of the hinged seat assembly normally rests upon the rails G about the upper part of the basket frame, the hooks 23 embracing these upper rails and supporting the hinged seat against downward collapse from its normal position in Fig. 8. When the leg closure plate or seat F is in its lowermost position, the link 50 has been pulled outwardly so that the projection K depending from the back of the seat is positioned in the outer end of the elongated loop L of the link 50. During the initial closing movement the projection K at the bottom of the seat back normally swings outwardly and pulls on the link causing the plate F to swing from its seat engaging position upwards towards the gate and as the gate carrying the structure moves further towards a horizontal position due to the telescopic association of another cart, the plate F passes dead center position and then due to gravity falls to its leg closing position, moving with it the link and providing sufficient area in the slot L for the free travel of the base of the depending loop in the seat back.

When the gate carrying the seat returns to normal position, the leg opening closure plate F retains its upright position due to the fact that the loop e of the plate frame has dropped inwardly of the medial depending portion of the rod 10 as in the prior form. This position of the parts prevents the plate F from falling to horizontal position until lifted vertically on its elongated pivots 25 and permitting the disengagement of the associated loops.

What I claim is:

1. In a telescoping cart assembly including upright supports, a receptacle of tapered form carried by said supports and having an end gate, said gate being hingedly supported at its upper end to said receptacle to permit telescopic association of a second cart of similar construction, leg openings formed in said gate, a seat structure for said assembly including a seat supporting frame hinged to the gate immediately below said leg openings, a seat back, said seat back being hinged to said seat supporting frame at its outer portion for folding movement toward said frame, means swingably mounting said seat back on the upper portion of said receptacle, a plate hinged to the gate below the leg openings and adapted for pivotal movement from a horizontal position on said seat supporting frame to a vertical position closing said leg openings, and a trigger means mounted upon and extending outwardly of the gate and adapted to be operated by impact upon telescopic association with a second cart, said trigger mechanism having a movement sufficient to engage one edge portion of said plate to swing the same on its pivot to elevated vertical position upon initial movement of the swinging gate to its upper position due to said impact.

2. The structure of claim 1 characterized in that the trigger means comprises an elongated structure hinged to the bottom of the swinging gate and having an inwardly projecting portion engaging the gate at a point spaced from its pivot for limiting the trigger movement.

3. The structure of claim 1 characterized in that the plate includes a frame having an extension which projects through the swinging gate and is adapted to be engaged by the trigger means.

4. The structure of claim 1 characterized in that the plate pivots are so constructed and arranged as to permit the plate to be pivoted or to be moved in its own plane.

5. The structure of claim 1 characterized in that the plate is mounted on the gate by hook members and includes a medial projection which extends through the gate when the latter is in its horizontal position and engages a gate part when in its vertical position and provides a lock therefor.

6. In a telescoping cart assembly including upright supports, a receptacle of tapered form carried by said supports and having a swinging end gate mounted at its top portion on said receptacle to permit telescopic association of a second cart of similar construction, leg openings formed in said gate, a seat structure for said assembly including a seat supporting frame hinged to the gate immediately below said leg openings, a seat back hinged to the seat supporting frame, means swingably mounting said seat back on the upper portion of said receptacle, a plate pivoted to said frame adjacent said leg openings adapted for pivotal movement from a horizontal position on said seat supporting frame to a vertical position closing said leg openings, and a link connecting the bottom portion of the seat back with the outer marginal edge portion of said plate, whereby movement of said seat back to folded position will swing said plate on its pivots toward a vertical position.

7. The structure of claim 6 characterized in that the link is connected to the bottom edge of the seat back by an elongated eye permitting relative movement between the seat back and plate when the parts are in partially folded position.

8. In a telescoping cart assembly including upright supports, a receptacle of tapered form carried by said supports and having a swinging end gate hinged at its top portion to said supports to permit telescopic association of a second cart of similar construction, leg openings formed in said gate, a seat structure for said assembly including a seat supporting frame hinged to the gate immediately below said leg openings, a seat back hinged to the outer marginal edge portion of said seat supporting frame, means swingably mounting the upper portion of said seat back on the upper portion of said receptacle, a plate hinged to the gate adjacent the bottom portion of said leg openings and adapted for pivotal movement from a horizontal position on said seat supporting frame to a vertical position closing said leg openings, and means for initially moving said plate on its hinge from its horizontal position upon upward swinging movement of the gate under impact from an associated cart during telescopic movement of the parts.

9. In a telescoping cart assembly including upright supports, a receptacle of tapered form carried by said supports and having an end gate, said end gate being hingedly supported at its upper end to said receptacle for swinging movement from closed to open position to permit telescopic association of a second cart of similar construction, a leg opening formed in said gate, a seat structure for said assembly including a seat supporting frame hinged to the gate immediately below said leg opening, a seat back, said seat back being hingedly connected to said seat supporting frame at its outer portion for folding movement with respect to said seat frame, means swingably mounting the upper portion of said seat back on the upper portion of said receptacle, a plate hinged to said assembly at the bottom portion of said leg opening and adapted for pivotal movement from a horizontal position on said seat supporting frame to a vertical position closing said leg opening, and trigger means for moving said plate to its vertical position closing said leg opening upon initial movement of the hinged gate from its lower closed position to its upper open position.

10. In a telescoping cart assembly including upright supports, a receptacle of tapered form carried by said supports and having an end gate, said end gate being hingedly supported at its upper end to said receptacle for movement from a lower closed position to an upper open position to permit telescopic association of a second cart of similar construction, a leg opening formed in said gate, a seat structure for said assembly including a seat supporting frame hinged to the gate immediately below said leg opening, a seat back, said seat back being hingedly connected to said seat supporting frame at its outer portion for folding movement with respect to said seat frame, means swingingly mounting the upper portion of said seat back on the upper portion of said receptacle, a plate hinged to said assembly at the bottom portion of said leg opening and adapted for pivotal movement from a horizontal position on said seat supporting frame to a vertical position closing said leg opening, and trigger means connecting the bottom marginal edge portion of the seat back and the hinge assembly of said plate for initial actuating of the plate upon initial folding movement of the seat back.

11. The structure of claim 10 characterized in that the hinge assembly of the seat back and the hinge assembly of the plate both include extensions to which the trigger means is connected.

12. The structure of claim 10 characterized in that hinge links connect the medial portion of the outer marginal edges of the back with the outer portions of the hinged gate.

References Cited in the file of this patent

UNITED STATES PATENTS

| | | |
|---|---|---|
| 2,572,780 | Tackenberg | Oct. 23, 1951 |
| 2,662,775 | Goldman | Dec. 15, 1953 |

FOREIGN PATENTS

| | | |
|---|---|---|
| 1,027,679 | France | Feb. 18, 1953 |